May 5, 1959 R. M. WOYTYCH 2,884,801
AUTOMATIC POSITIONING DEVICE
Filed Aug. 11, 1955 8 Sheets-Sheet 1

INVENTOR
Raymond M.
Woytych
Carlson, Pitzner,
Hubbard & Wolfe
ATTORNEYS

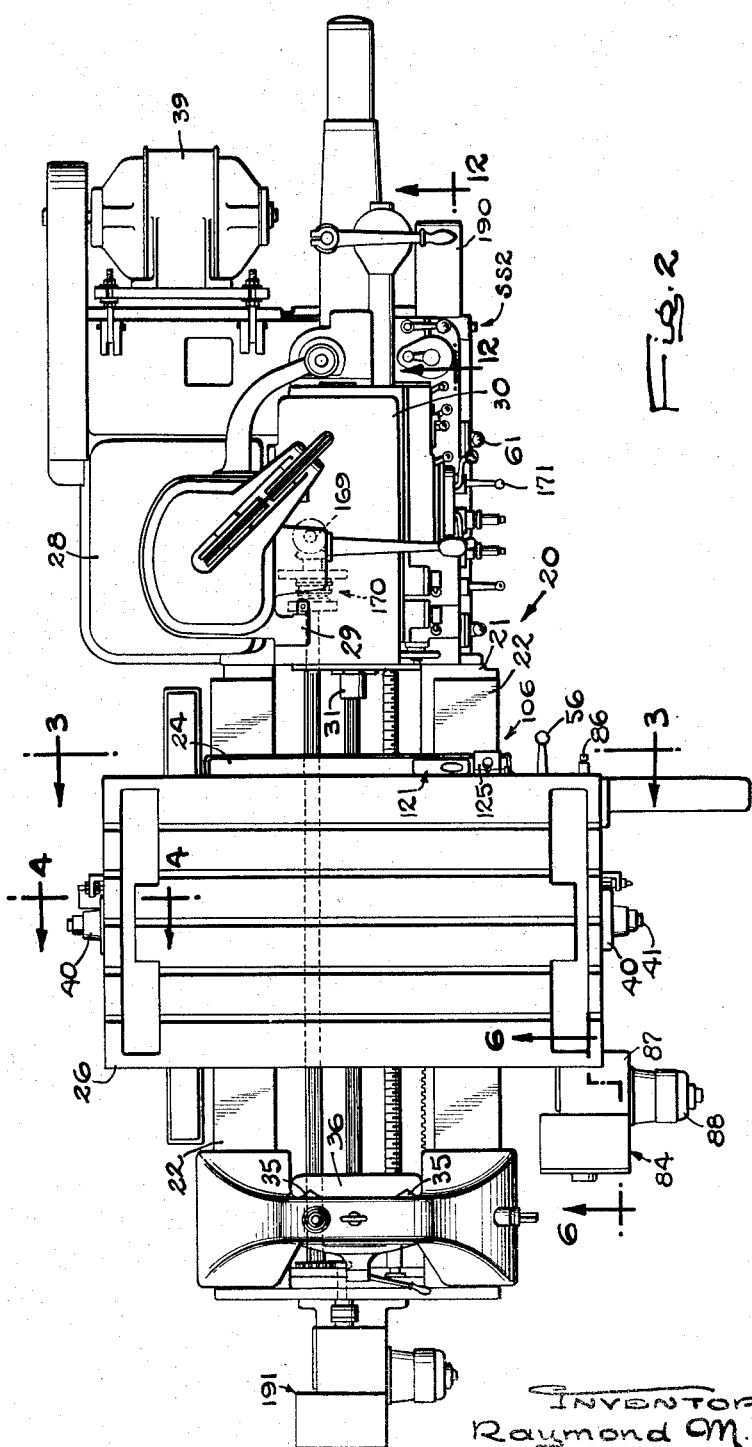

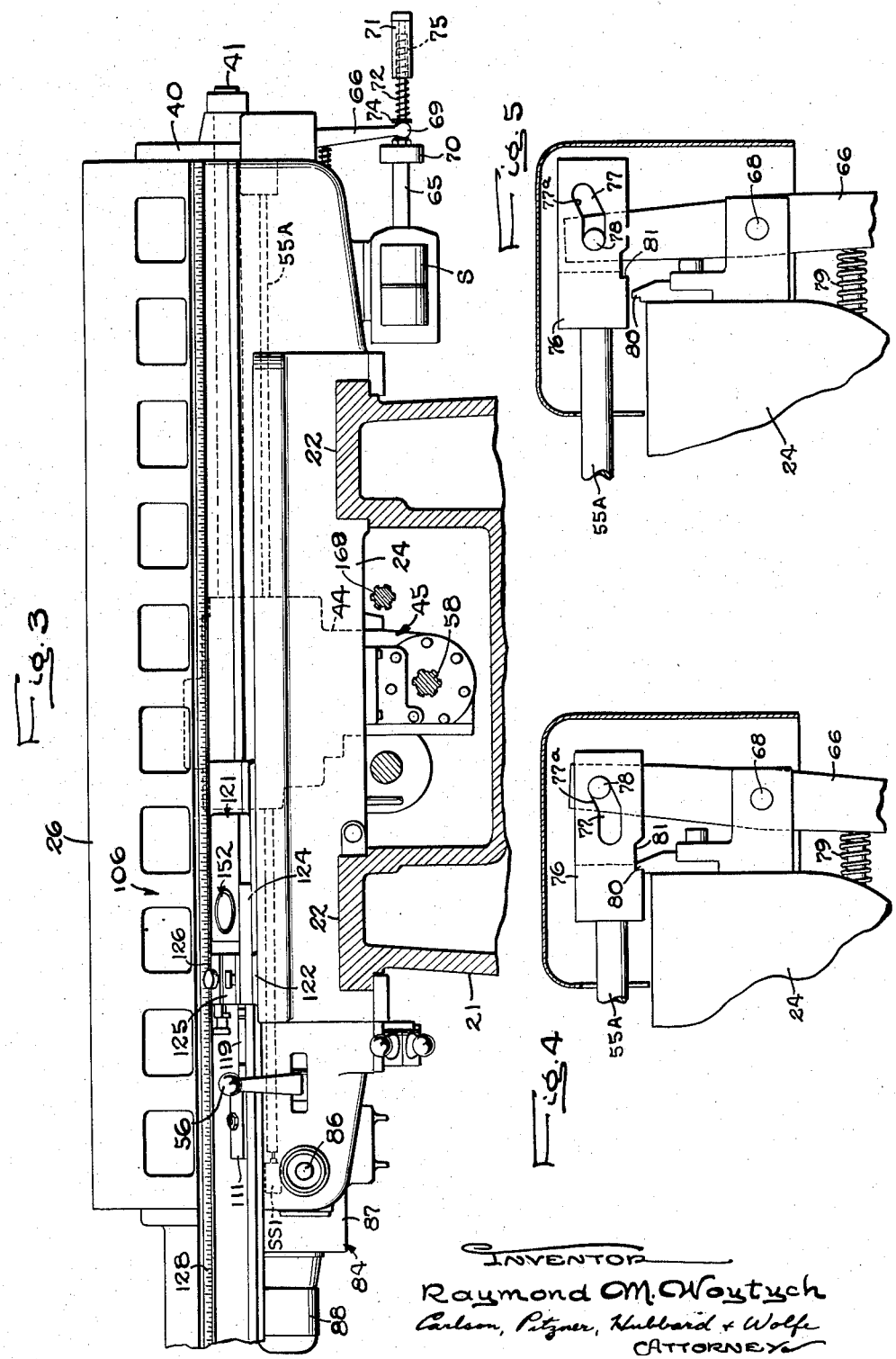

May 5, 1959 — R. M. WOYTYCH — 2,884,801
AUTOMATIC POSITIONING DEVICE
Filed Aug. 11, 1955 — 8 Sheets-Sheet 4

INVENTOR
Raymond M. Woytych
Carlson, Pitzner, Hubbard & Wolfe
ATTORNEYS

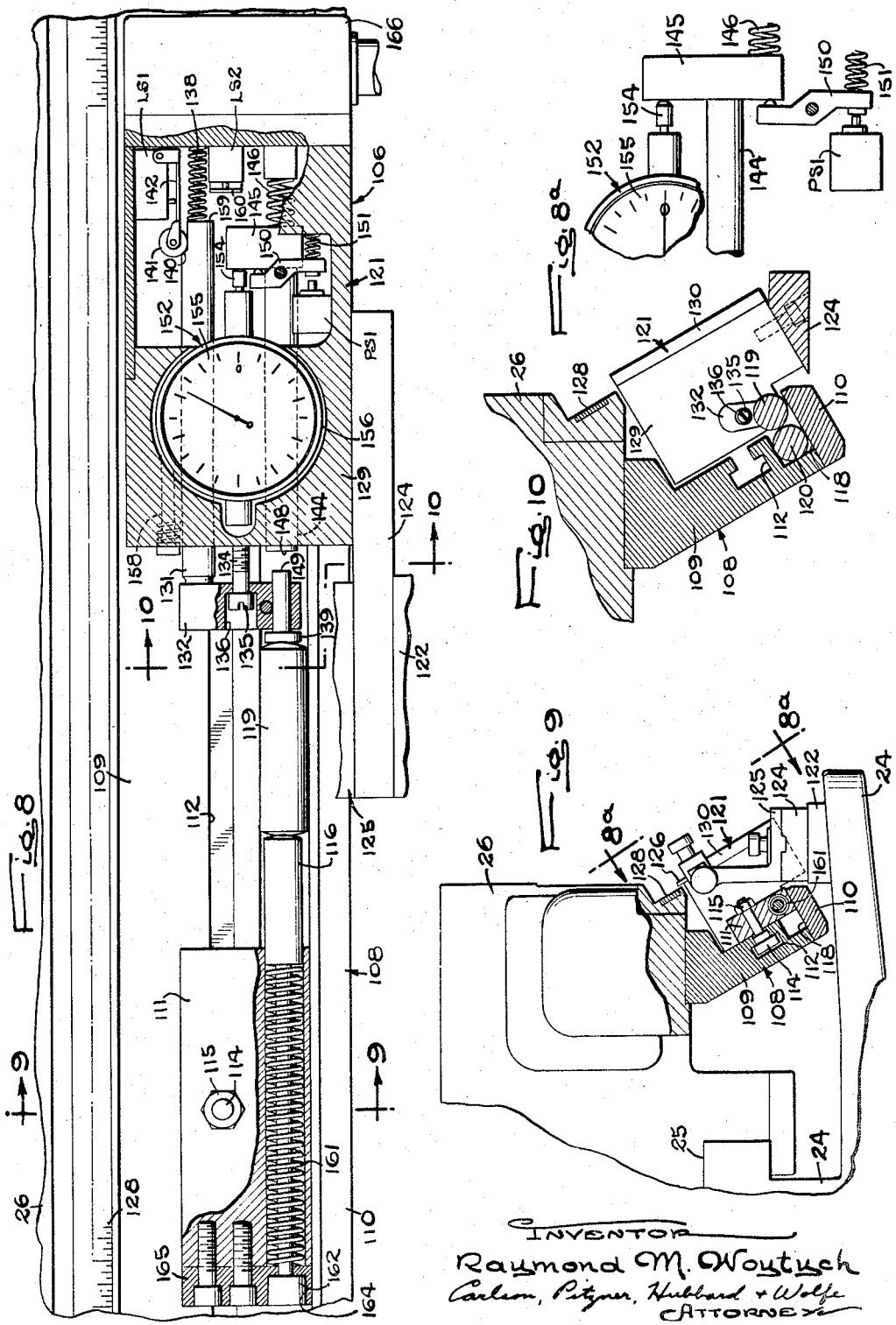

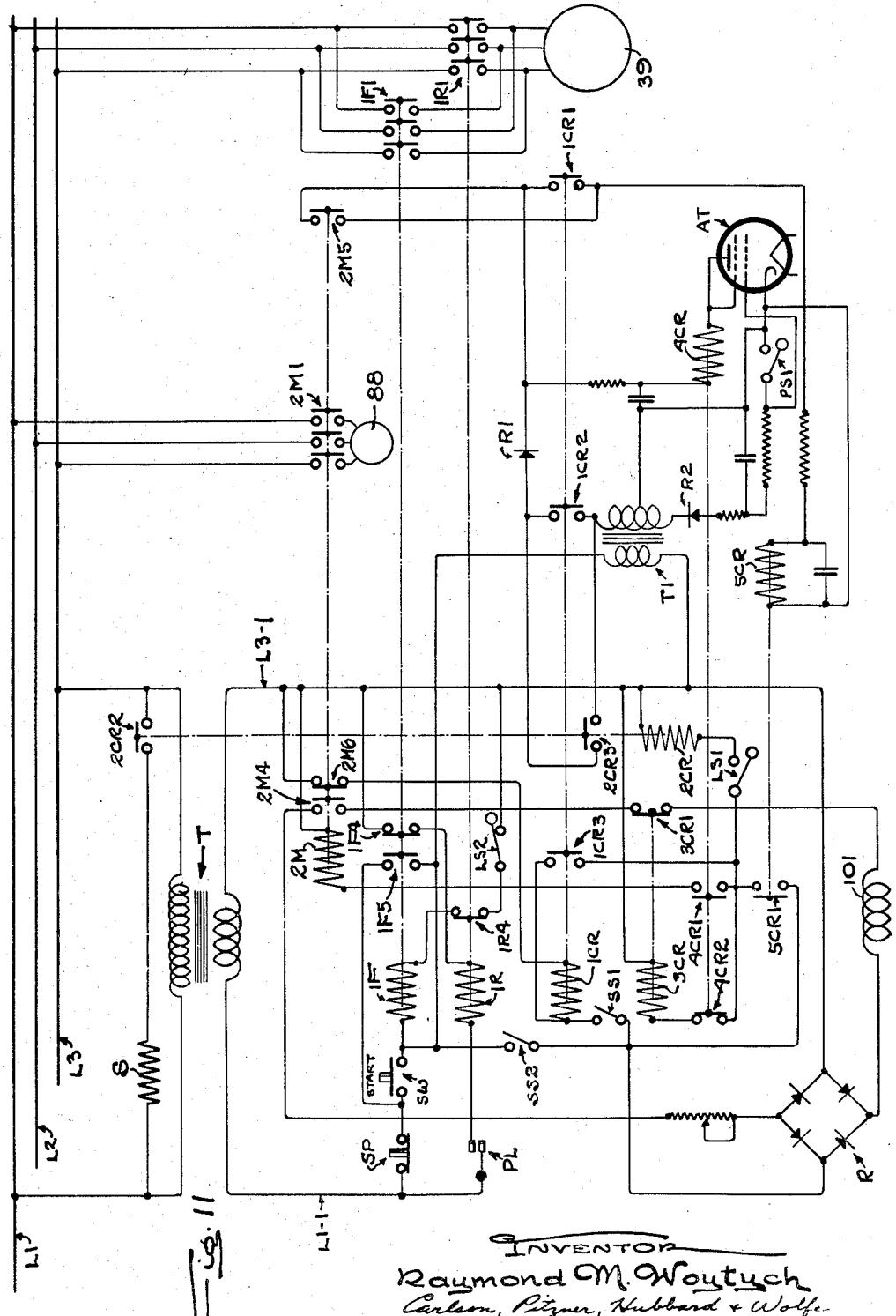

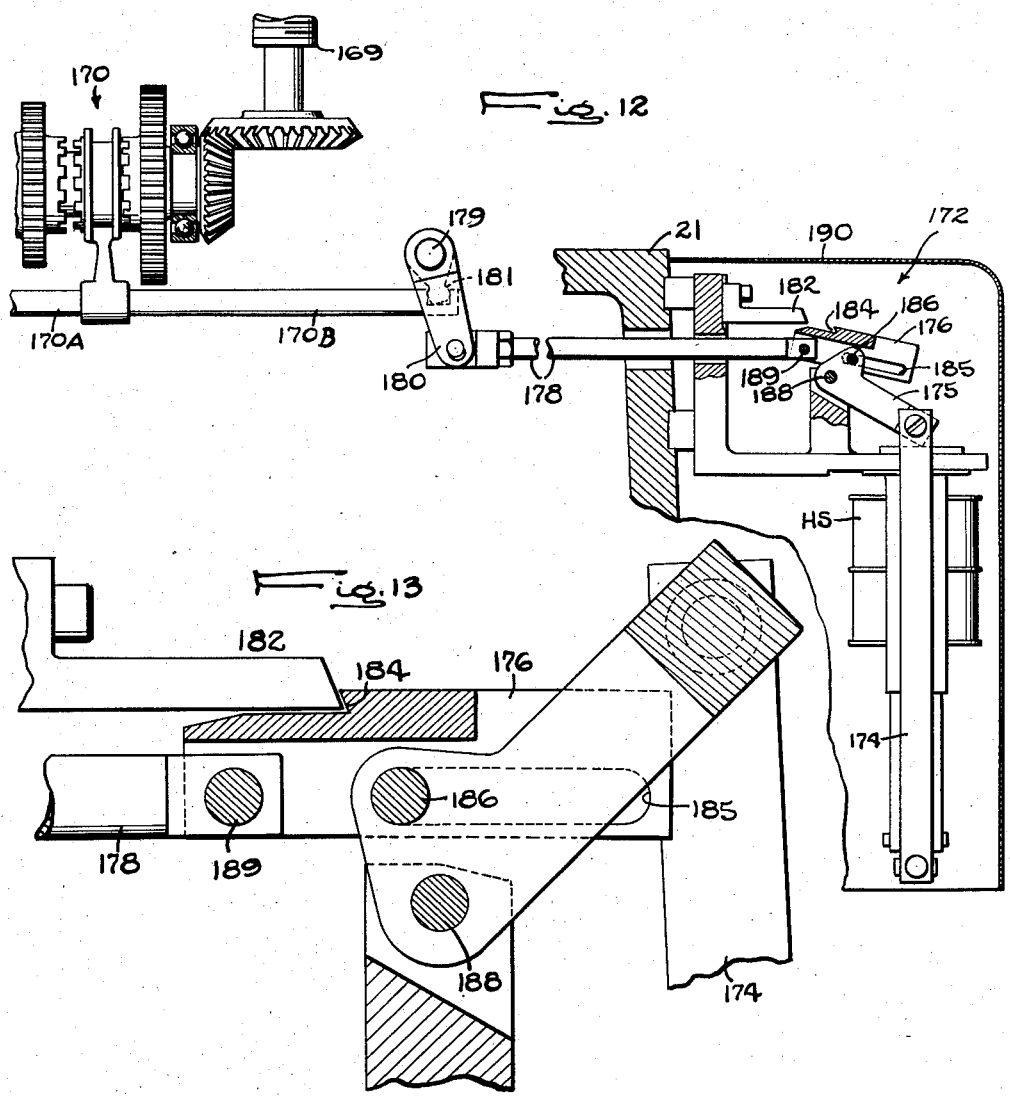

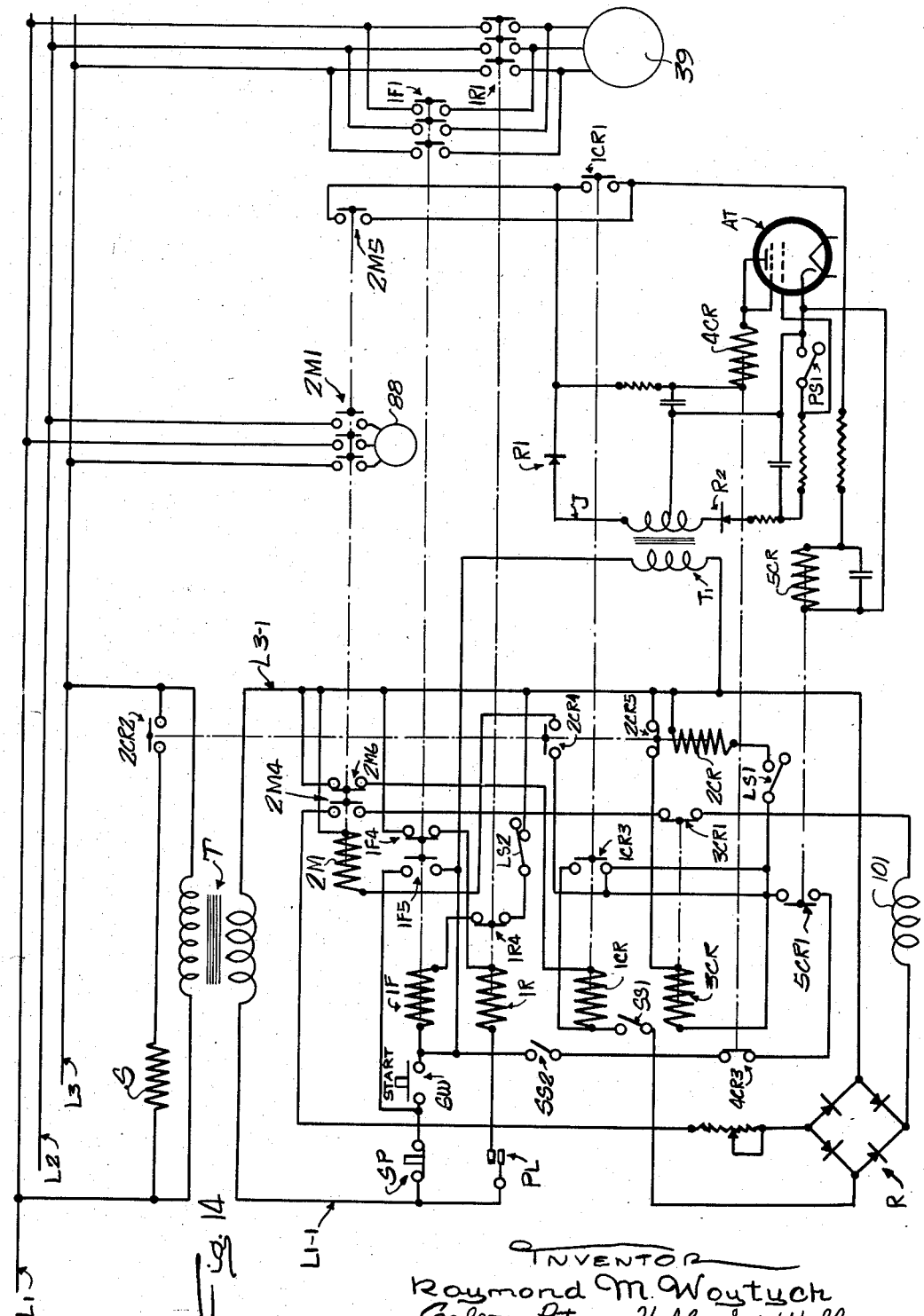

United States Patent Office 2,884,801
Patented May 5, 1959

2,884,801

AUTOMATIC POSITIONING DEVICE

Raymond M. Woytych, Fond du Lac, Wis., assignor to Giddings & Lewis Machine Tool Company, Fond du Lac, Wis., a corporation of Wisconsin Application August 11, 1955, Serial No. 527,713

16 Claims. (Cl. 74—472)

This application is a continuation-in-part of my co-pending application Serial No. 116,013, filed September 16, 1949.

The present invention relates generally to machine tools and more specifically to a novel device for automatically positioning a translatable machine member with a high degree of nicety and precision.

One object of the invention is to provide a device of the character set forth which will be capable of accurately positioning a translatable machine member in a predetermined location within a fraction of a thousandth of an inch and without the use of positive stops.

Another object is to provide an automatic positioning device possessing a high order of versatility and lending itself readily to utilization in a large variety of regular and special machine tools.

A further object is to provide a device of the foregoing type wherein special provision is made to protect the mechanism against jamming or breakage under abnormal operating conditions.

Another object is to provide an automatic positioning device characterized by its simplicity and dependability.

Other objects and advantages of the invention will become apparent as the following detailed description proceeds, taken in the light of the accompanying drawings, in which:

Fig. 2 is a plan view of the machine shown in Fig. 1.

Fig. 3 is an enlarged fragmentary sectional view taken transversely through the bed of the machine and in the plane of the line 3—3 in Fig. 2, the right-hand side of the work supporting table and the corresponding end of the saddle underlying the same being shown in elevation.

Figs. 4 and 5 are enlarged fragmentary elevational views taken in the plane of the line 4—4 of Fig. 2 and showing a portion of the actuating linkage of the directional control clutch operatively associated with the worktable.

Fig. 8 is an enlarged fragmentary face view of the measuring unit, certain of the parts being shown in section for purpose of clearer illustration.

Fig. 8a is a somewhat enlarged diagrammatic view of a certain portion of the switch actuating mechanism shown in Fig. 8.

Figure 1:
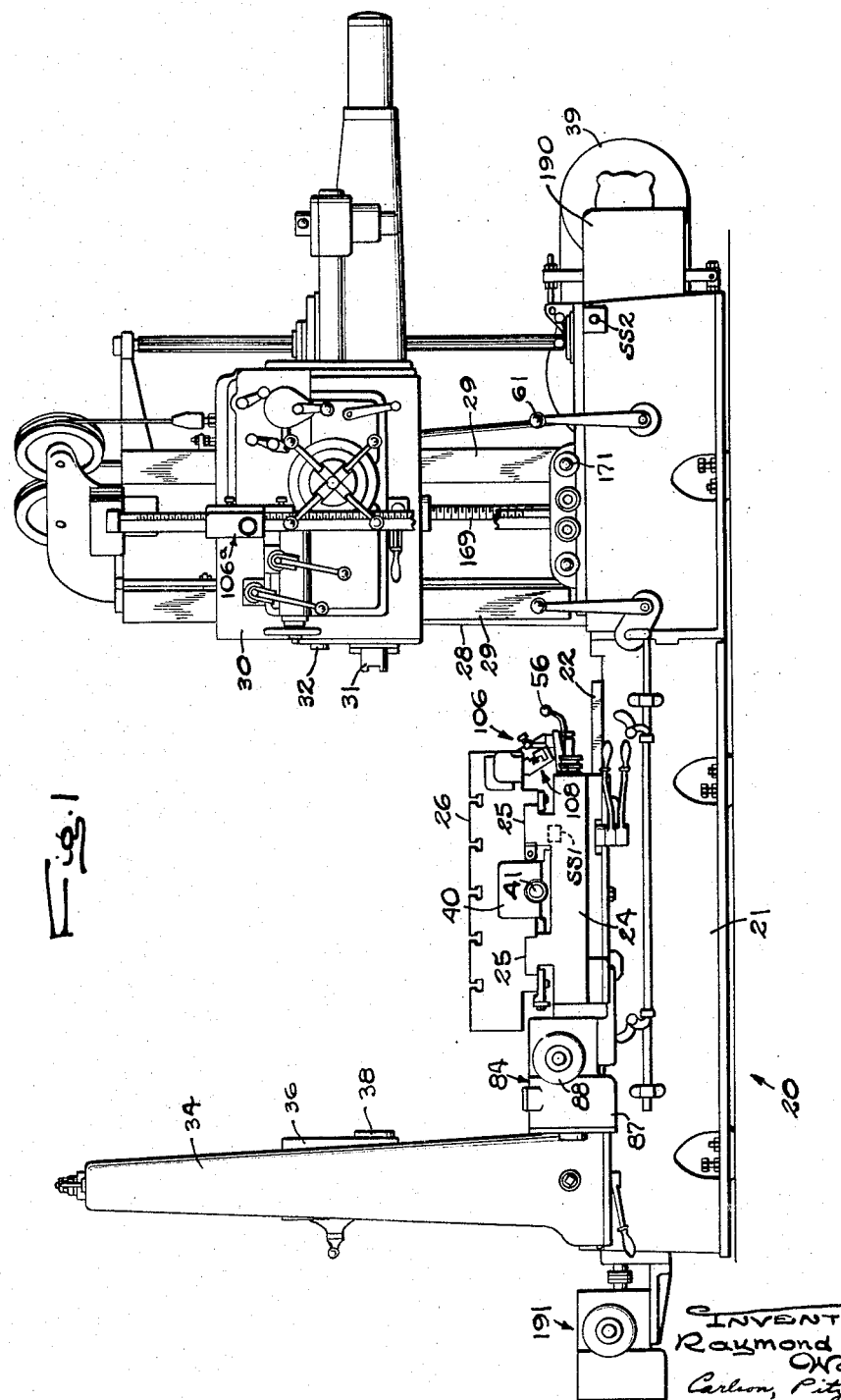
Figure 1 is a front elevational view of an illustrative machine equipped with an automatic positioning device embodying the present invention.

Figs. 9 and 10 are transverse sectional views through the measuring unit, taken in the planes of the lines 9—9 and 10—10 of Fig. 8, respectively.

Fig. 11 is a wiring diagram of the particular control circuit utilized in the automatic positioning device described herein.

Fig. 12 is an enlarged fragmentary vertical sectional view taken in the plane of the line 12—12 in Fig. 2 and illustrating the operating mechanism for the directional control clutch associated with the headstock.

Fig. 13 is an enlarged fragmentary sectional view showing in moved position a portion of the mechanism illustrated in Fig. 12.

Fig. 14 is a wiring diagram somewhat similar to Fig. 11 but showing a control circuit for a modified automatic positioning device also embodying the invention, such modified device being adapted to position the machine member without reversal thereof.

While the invention is susceptible of various modifications and alternative constructions, certain illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

Automatic positioning devices embodying the present invention are applicable to a wide variety of machine tools. They find particular, but by no means exclusive, utility in connection with the positioning of certain translatable machine members of horizontal boring, drilling and milling machines such as the one disclosed in U.S. Patent No. 1,858,491, issued May 17, 1932, to Keith F. Gallimore. For purposes of illustration only, the device described below has been shown as installed on a machine 20 such as the one disclosed in the foregoing patent. Since the details of the machine per se form no part of the invention, it will suffice for the present to note that the machine 20 comprises a horizontal main frame or bed 21 which is normally adapted to be bolted upon a supporting floor in a manner well known in the art. The bed 21 is hollow, elongated and generally rectangular in form.

Along its upper side edges, the bed is provided with suitable longitudinal guides or ways 22 which are directly engaged by a saddle 24 for movement along the bed 21 (see Figs. 1 to 3). The saddle 24 is provided on its top with horizontal transverse guides or ways 25 having a worktable 26 mounted thereon for movement transversely of the bed.

Rigidly mounted on one end of the bed 21 is an upstanding column 28 provided with vertical guides or ways 29 on which a spindle headstock 30 is adapted to travel. The headstock 30 comprises a main horizontal spindle 31 and a parallel auxiliary spindle 32, both spindles projecting from the side adjacent the tables 26 for the attachment of tools (not shown) adapted to operate on work secured to the table.

Removably and adjustably mounted on the ways 22 on the other end of the bed 21 is an upstanding column or support 34 provided with guides or ways 35 on which an end block or tailstock 36 is adapted to travel synchronously with the headstock 30. The tailstock 36 carries a suitable support 38 adapted to be positioned in axial alinement with the main spindle 31 and to coact therewith in suporting a suitable tool bar or arbor.

The power drive means includes a main drive motor 39, together with variously adjustable speed transmissions and direction control elements. Thus power is available selectively to rotate the spindles 31 and 32, to feed either spindle axially in either directon, to feed the headstock 30 vertically in either direction, to feed the tailstock 36 synchronously with the headstock 30, to feed the saddle 24 along the bed 21 in either direction, and to feed the table 26 transversely of the bed in either direction. Power is also available to effect various combinations of these movements.

The embodiments of the present invention as utilized in the machine 20 are adapted to automatically position both the worktable 26 and the headstock 30. Since the positioning mechanism is substantially identical in each case, it will only be necessary here to describe in detail the mechanism as applied to the worktable.

It will be helpful to keep in mind that the overall purpose of the mechanism described below is to halt the table at a preselected or predetermined position at the conclusion of a given cycle of movement transversely of the ways. Thus the table 26 is driven from a starting position in rapid traverse which is automatically cut off as the table approaches the predetermined position, the table being allowed in the present instance to coast past such position. The table is then automatically driven at a low or feed speed in the opposite direction and automatically stopped when it again reaches the predetermined position. After each positioning operation, the table 26 is returned to its starting position by means of an appropriate manual control. The foregoing movements are accomplished by means of rapid transverse forward and low feed reverse drives which alternatively actuate a table transmission as dictated by a measuring unit and its associated electrical control circuit.

The terms "rapid traverse" and "low feed" as used herein refer only to rates of movement utilized for the automatic positioning cycle. They are not necessarily the same rates which would be used in a metal cutting or operating cycle.

Table transmission

For the purpose of driving the table 26 transversely of the bed 21 during the automatic positioning operation, resort is had to a construction similar to that used in the machine shown in the Gallimore patent, supra. The table 26 is accordingly provided with depending end plates 40 carrying a stationary crossfeed screw 41 which extends longitudinally through the table between the saddle ways 25 (see Figs. 1, 3 and 7). The screw 41 passes through a geared driving nut 42 which is journaled within casing 44 of transmission unit 45. Located within the unit 45 is a gear 46 which is keyed or otherwise rigidly fixed to a shaft 48. The latter supports a direction control clutch 49 comprising a pair of gears 50, 51 rotatably mounted on the shaft 48 in spaced relation and formed on their adjacent faces with clutch teeth. A clutch sleeve 52, also having end teeth, is splined to the shaft 48 between the gears 50, 51 and is movable selectively in opposite directions from a central neutral position to alternative positions of engagement with the gear 50 or the gear 51. A shifter shoe 54 engages the sleeve 52, and is secured to a shifter rod 55 extending longitudinally of the saddle and parallel to the ways 25 thereon. Adjacent the front of the saddle (as viewed in Fig. 1) and projecting outwardly through an opening in the side wall thereof is a direction control lever 56 having an appropriate connection with the shifter rod 55 to move the same axially and thereby actuate the clutch 49.

Rapid traverse forward

Under normal operating conditions, power for traversing the worktable 26 is obtained from the main drive motor 39 via a main transmission mechanism (not shown) located within the right-hand end portion of the machine bed 21. Such a transmission is described in detail and illustrated in Fig. 40 of the Gallimore patent mentioned above and has a plurality of driven shafts extending longitudinally of the bed for driving the headstock, the tailstock, the saddle and the table. In the machine 20, centrally located shaft 58 (see Figs. 2, 3 and 7) connects the main transmission and the transmission unit 45 of the table. Drivingly mounted on the shaft 58 as by means of a splined connection are cluster gears 59, 60. The latter are located within casing 44 of the unit 45 and are adapted to drive the table alternatively in the forward or reverse direction, depending upon the position of the clutch shifting sleeve 52. The terms "forward" and "reverse" as used herein refer to the machine as viewed in Fig. 1, forward movement of the table being in a direction away from the observer and reverse movement of the table being in a direction toward the observer. The speed at which shaft 58 drives the table will be determined by the condition of the transmission and is controllable by means of a selector lever 61 (Figs. 1 and 2) located on the right-hand end portion of the front of the machine bed. For the positioning operation, the lever 61 is left in position for direct drive of the shaft 58, which correspondingly moves the table 26 at the rapid traverse rate.

Figure 7:
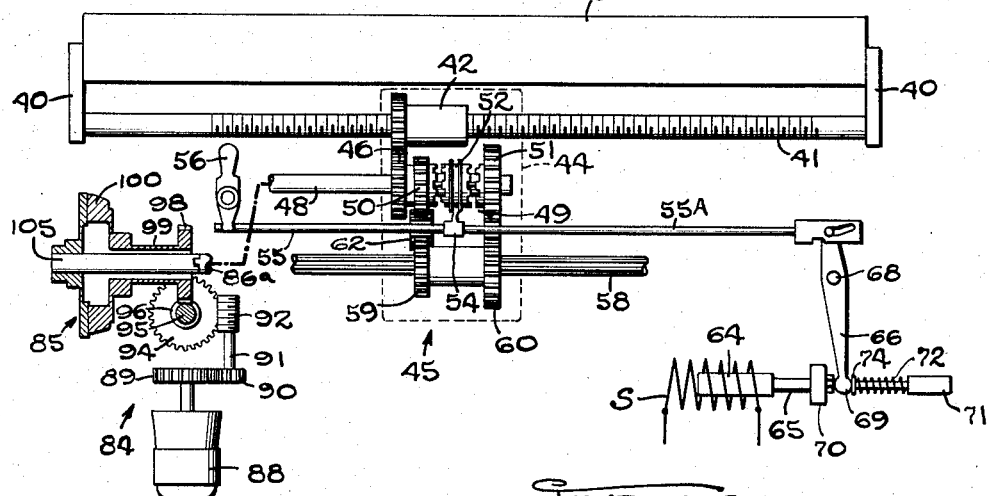
Fig. 7 is a diagrammatic view of the worktable including a portion of its drive and illustrating the relationship between the rapid traverse and the low feed positioning drives.

With the foregoing construction, rapid traverse of the table 26 in the forward direction can be initiated simply by shifting the direction control lever 56 to the right (as viewed in Figs. 3 and 7). This moves the shifter rod 55, the shoe 54 and the clutch shifting sleeve 52 to the left for engagement with the gear 50, which receives power from the left-hand cluster gear 59 via an idler 62. When such connection is effected, the table 26 moves to the right (as viewed in Figs. 3 and 7).

Directional clutch knockout mechanism

Provision is made for shifting the direction control clutch 49 from rapid traverse forward to its neutral position by power means as the table 26 moves forwardly, or to the right as viewed in Figs. 3 and 7. This is accomplished in the present instance by mounting a solenoid S on the underside of the saddle 24 at its rearward end. The solenoid is provided with the usual sliding armature or core 64 which is integral with a plunger 65. The latter is mechanically connected to the clutch shifter rod 55 by means of an axial extension 55A of the rod 55 and a lever 66 pivoted to the saddle as at 68. The lower end of the lever 66 terminates in a bulbous portion 69 having a bore which slidably engages a necked-down portion of the plunger 65, the portion 69 being interposed between a weight 70 and an abutment 71 fixed in spaced relation on the plunger 65. A relatively weak spring 72 is interposed between the portion 69 and the abutment 71. One end of the spring abuts against a washer 74 which contacts the portion 69 and the other end of the spring fits into an annular recess 75 within the abutment 71. The tension of the spring 72 is such that upon energization of the solenoid S, the spring 72 will telescope completely into the recess 75 permitting the abutment 71 to strike the depending end of the lever a hammer blow for rapid disengagement of the clutch 49, the weight 70 being of appropriate size to produce the desired impact.

For the purpose of effecting a pivotal connection with the upper end of the lever 66, the adjacent end of the shifter rod extension 55A is fashioned with an enlarged bifurcated end portion 76, each arm of the latter having a slot 77 which engages a transverse pin 78 carried by the lever 66. Normally, when the solenoid S is de-energized, the lever 66 is biased into the position indicated in Figs. 5 and 7 by means of a spring 79, the pin 78 being located at the left-hand end of the slot 77 when the clutch is in neutral position.

In order to limit the function of the solenoid S to merely shifting the clutch sleeve member 52 from the rapid traverse forward position to its neutral position, and thereby preclude carrying over of the member 52 into its reverse position, while leaving the member 52 free to be shifted into all three of its positions by the manual direction control lever 56, a novel interlock means is provided. In furtherance of such objective, there is mounted at the edge of the saddle 24 and in underlying relation with the bifurcated end 76 of the shifter rod extension, an upstanding transverse abutment 80. The underside of the end portion 76 is fashioned with a cooperating notch 81 and the right-hand end portion of each slot 77 is upwardly inclined as at 77A. With the foregoing structure, when the clutch member 52 is in the rapid traverse forward position and the solenoid is de-energized, the underedge of the notch 81 rests upon the abutment 80, and the pin 78 of the lever 66 is at the right-hand end portion 77A of the slot 77. The notch 81 is elongated sufficiently to permit movement of the end portion 76 to this position from its neutral position. Upon energizing of the solenoid S, the lever 66 snaps sharply in a clockwise direction and draws the shifter rod extension 55A and its end portion 76 to the right. As soon as the notch 81 encounters the abutment 80, the portion 76 drops downwardly and the left-hand side wall of the notch 81 enters into solid abutting engagement with the abutment 80, thus arresting further right-hand movement of the shifter rod 55A and maintaining the clutch shifter 52 in the neutral position.

On the other hand, when the solenoid S is de-energized and the lever 66 occupies the position indicated in Figs. 5 and 7, the shifter rod 55 and its extension 55A remain perfectly free for shifting the clutch sleeve 52 into all three of its positions without interference from the abutment 80 and the notch 81, the pin 78 maintaining the end portion 76 high enough to provide clearance between its underedge and the top of the abutment 80 even when the shifter rod is moved manually into its extreme right-hand or rapid traverse reverse position (as shown in Fig. 5). To insure proper functioning of the interlock mechanism by protecting its parts against the entry of dirt and chips, a shield or cover 82 is provided.

Low feed positioning drive

For the purpose of moving the table precisely into its predetermined position after the rapid traverse forward drive has been cut off, a separate low feed positioning drive unit 84 is provided. In the present instance, the unit 84 is adapted to act as a low speed reverse drive which returns the table to predetermined position after it has coasted through such position. The unit 84 is mounted at the left-hand forward end of the saddle 24 (as viewed in Fig. 1) and connected to the table transmission unit 45 via appropriate speed reduction gearing and a clutch 85 which happens to be of the electro-magnetic type. The foregoing connection is effected by taking advantage of the presence of alined shafts 86 located at the front of the table and having ends projecting laterally therefrom for manual reversing of the table, the shafts 86 being connected by suitable bevel gears to the shaft 48 of the table transmission unit. Since such connections per se form no part of the present invention, they have been indicated diagrammatically in Fig. 7.

Figure 6:
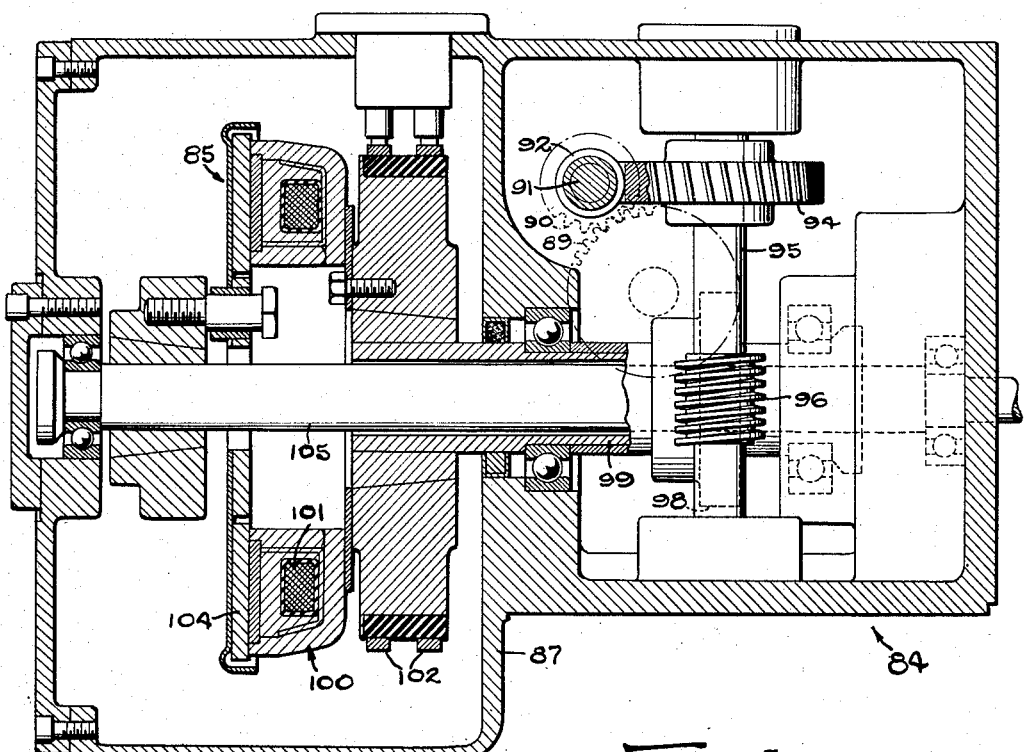
Fig. 6 is an enlarged, broken sectional view taken vertically through the low feed driving unit and in the plane of the line 6—6 in Fig. 2.

Referring more particularly to Figs. 6 and 7, it will be perceived that the unit 84 comprises a casing 87 which houses a low feed driving motor 88 connected by pick-off gears 89, 90 to a worm shaft 91 and a worm 92. The latter, in turn, drivingly engages a worm wheel 94 which drives a second worm shaft 95 and a worm 96. The latter meshes with a worm wheel 98 fixed to rotatable sleeve 99 which is integrally connected to driving member 100 of the electromagnetic clutch. The member 100 in the present instance carries a clutch winding 101 and collector rings 102 for energizing the same. Operatively associated with the member 100 is the usual disc member 104 which is rotatable with an output shaft 105 concentric with the sleeve 99. The output shaft 105 has a suitable detachable connection with extension 86A of manual table actuating shaft 86.

To render the unit 84 effective to traverse the table, it is only necessary to move the shifter sleeve 52 of the direction control clutch into neutral position and thereupon energize the feed motor 88 together with the winding 101 of the magnetic clutch 85.

Measuring unit

In order that the cutoff of the rapid traverse forward drive, as well as the energizing and de-energizing of the low speed positioning drive, will occur in properly timed relation to achieve the desired positioning of the table 26, a measuring unit 106 is provided. The unit 106, which in this case is double acting, comprises certain parts carried by the table 26 and certain other parts carried by the saddle 24. Thus there is fixed to the underside of the table, adjacent its right-hand edge as viewed in Figs. 1, 9 and 10, a relatively long L-shaped bracket or gage rod trough 108. The trough 108 is formed with a back wall 109 inclined in the present instance at an angle of about 60° with the horizontal and terminating at a perpendicular sill 110 running longitudinally thereof.

Adjustably mounted on the wall 109 of the gage rod trough and adjustably positionable longitudinally thereof is a stop block 111. The adjustment means for the latter may conveniently comprise a T-slot 112 formed in the wall 109 together with a cooperating T-bolt 114 and a clamping nut 115 threaded thereon. Projecting from the right-hand end of the block 111 (as viewed in Fig. 8) is a stop rod 116 which, under normal operating conditions, serves as a positive stop against which measuring or gage rods are stacked.

To accommodate the trough 108 for use with standard gage rods or for use with special job rods, the wall 109 has a longitudinal slot 118 adjacent the sill 110. With such arrangement, special job rods having laterally projecting pins may be clamped within the slot 118 so that their projecting pins intercept the axis of the stop rod 116. On the other hand, when standard gage rods such as the rod 119 are used, it is necessary to insert a filler piece 120 in the slot 118 to bring the axis of the rod 119 into alinement with the axis of the stop rod 116, the rod 119 being clamped in such position in any convenient manner.

Operatively associated with the gage rod trough 108 and the parts mounted thereon is a gage head 121 (Figs. 8 to 10) rigidly fixed to the saddle 24. The latter is accordingly provided with a flat pad 122 located adjacent the trough 108. Rigidly secured to the pad 122 is a bracket 124 which carries the gage head 121. In addition to supporting the gage head, the bracket 124 may also support a vernier bracket 125 having mounted thereon a vernier scale 126 for use in conjunction with a measuring scale 128 carried by the table.

Turning now to the details of the gage head, it will be noted that the latter is organized upon a body 129 (Fig. 8) which may be equipped with an access cover 130 for the protection of its internal mechanism. Slidably held within a suitable bore in the body 129 is a rapid traverse cutoff push rod or plunger 131 having a transverse arm 132 fixed to the outer end thereof. The plunger 131 is constrained against rotation by means of an anchor screw 134 fixed to the body 129 and having a head 135 which engages a counterbore 136 in the transverse arm. A spring 138, bearing against the inner most end of the plunger 131, serves to bias the latter into the position indicated in Fig. 8 where the head of the screw 134 abuts solidly against the bottom of the counterbore 136. The free end of the transverse arm 132 carries a button element 139 which is adapted to engage the adjacent end of gage rod 119, being coaxial therewith.

As an incident to forward movement of the table at the rapid traverse rate during a normal positioning cycle, the right-hand end of the gage rod 119 will accost button 139 and carry the plunger 131 to the right (as viewed in Fig. 8). Such plunger movement is effectively utilized to cut off the rapid traverse forward drive. For this purpose, the innermost end of the plunger 131 is formed with a suitable cam shoulder 140 which serves to actuate the limit switch LS1 as by means of a follower roller 141 and a pivoted arm 142. By the use of appropriate electrical controls which will be subsequently described in detail, actuation of the limit switch LS1 serves to energize solenoid S and thereby operate the directional clutch knockout mechanism described earlier herein.

To render effective the low feed positioning drive unit after cutoff of the rapid traverse forward drive and coasting of the table beyond its predetermined or preselected position, the gage head 121 is provided with a final positioning plunger 144 slidably housed within the body 129 and having an integral transverse arm 145 at its innermost end. A biasing spring 146 serves to maintain the plunger 144 in a position wherein its left-hand end face 148 is normally situated a predetermined distance from opposing end face 149 of the shank of button member 139.

With the foregoing structure, as the table 26 coasts after the cutoff of the rapid traverse forward drive, the end face 148 of the plunger 144 will be accosted by the end face 149 of the button shank. As the forward momentum of the table becomes dissipated, the plunger 144 will consequently be moved a slight distance to the right (as viewed in Figs. 8 and 8a). Such movement is utilized to actuate a positioning switch PS1 which is adapted to initiate the low feed positioning drive in a reverse direction by means of appropriate controls which will be described subsequently herein. The switch PS1 may conveniently be operated by the plunger 144 through the use of a rockable lever 150 pivoted to the body 129 and disposed for engagement by the arm 145. A small biasing spring 151 may also be associated with the lever 150, as indicated in Figs. 8 and 8a. Continued operation of the low feed positioning drive will move the table 26 slowly to the left, permitting the plungers 131 and 144 to recede toward their normal positions under the action of their biasing springs 138, 146. Such receding movement of the plunger 144 is utilized to actuate the final positioning switch PS1 a second time, and to do so at substantially the instant the table 26 reaches its predetermined position. This second actuation of the switch PS1 serves to stop the low feed positioning drive leaving the table at the predetermined or preselected position. Due to the low rate of traverse of the table when moving in low feed positioning drive, any coasting effect, if present at all, is negligible.

To provide a visual check on the accuracy of the positioning operation, the gage head 121 may also include a dial indicator 152 having a stem 154 disposed for movement parallel to the plunger 144 and engageable by the transverse arm 145. The graduated face 155 of the indicator is rotatable so that a zero setting can be obtained, the peripheral rim 156 of the face being knurled for engagement with a detent 158 situated in the body of the gage head.

The measuring unit 106 preferably includes certain safety features to prevent damage to the positioning device and to the machine 20 under unusual or abnormal operating conditions. If, for example, the rapid traverse forward drive fails to cut off at the proper time due to sticking of the directional control clutch or failure of its knockout mechanism, both the plunger 131 and the plunger 144 will be moved an extreme distance to the right. Under such circumstances, inner end face 159 of plunger 131 will eventually accost operating member 160 of an emergency limit switch LS2. By means of appropriate electrical controls, actuation of the switch LS2 in this manner serves to disconnect the normal power supply to the main driving motor 39 and at the same time to plug the motor to a stop. To preclude jamming of the parts during the foregoing emergency action, a relatively stiff but yieldable spring 161 is housed within stop block 111 and disposed in surrounding relation with a portion of the stop rod 116 of reduced diameter. Normally, the spring 161 exerts sufficient force to maintain solid abutment between nut 162 on the tail end of the stop rod and the bottom of a counterbore 164 in end plate 165 of the stop block. Should the rod 116 encounter an abnormal axial thrust, however, the spring 161 will compress and permit telescoping of the rod 116 within the block 111.

The electrical connections to the switches housed within the gage head 121 may be effected in any convenient manner. In the present instance, such connections are all made from a terminal block (not shown) located at the right-hand end of the gage head 121 and protectively encased within a cover 166.

*Control circuit*

In Fig. 11, there is shown an electrical control circuit which is particularly well adapted for use in the form of automatic positioning device described earlier herein, both as applied to the worktable and also to the headstock. However, other circuits which would be susceptible of satisfactory operation in such environment could also be employed.

Referring to the diagram, it will be perceived that power is supplied to the circuit through the lines L1, L2 and L3 which carry three-phase alternating current. The main drive motor 39 can be connected to the lines L1, L2 and L3 for normal or forward rotation by means of a forward contactor 1F having a set of main contacts 1F1. Connection of the motor to the supply lines for reverse rotation can be accomplished by means of a reverse contactor 1R having a set of main contacts 1R1. The actuating windings for these contactors, as well as most of the control members, are connected into a single-phase control circuit L1–1, L1–3, which in the present instance operates at a stepped down voltage through a transformer T.

To provide means for starting the main drive motor 39 prior to initiation of an automatic table positioning cycle, the winding of the forward contactor 1F is connected in series with a manual start button SW and the emergency limit switch LS2 which is actuated by the rapid traverse cutoff plunger 131 in the gage head. Sealing-in contacts 1F5 serve to maintain winding 1F in an energized condition upon release of starting button SW, a circuit being completed from line conductor L1–1 via a stop button SP, contacts 1F5, the actuating winding of the contactor 1F, reverse interlock contacts 1R4, normally closed emergency limit switch LS2, and thence to line conductor L3–1.

To allow actuation of the automatic positioning device after the main drive motor 39 has been started, a manually operated switch SS2 is provided. The latter is mounted within easy reach of the operator at the right-hand end of the bed 21 (as viewed in Figs. 1 and 2) and must be closed before the automatic positioning device can be used. The switch SS2 is connected in series with sealing-in contacts 1F5 of the main drive motor contactor 1F and also comprises a link in the energizing circuit of control relays 1CR, 2CR and 3CR, low feed motor contactor 2M, and rectifier R which supplies DC current to the winding 101 of the low feed magnetic clutch 85.

In order to set up the control circuit for the condition wherein the table travels at its rapid traverse forward rate, there is mounted adjacent the left-hand end of the direction control shifter rod 55 (Figs. 1 and 3) a limit switch SS1 which is series connected with the manual switch SS2. The switch SS1 is adapted to close when the direction control lever 56 and the shifter rod 55 are moved rightwardly into their rapid traverse forward position. Closure of the switch SS1 serves to complete an energizing circuit for the actuating winding of the control relay 1CR which coordinates the operation of certain electrical interlocks.

The actuating solenoid S of the direction control clutch knockout mechanism is adapted to be energized directly from main lines L1, L3 via contacts 2CR2 of the relay 2CR. The latter is connected in series with the normally open limit switch LS1 in the gage head and is adapted to be energized upon the closure of such switch in response to rightward movement of the rapid trasverse cutoff plunger 131. This circuit also includes the normally open contacts 5CR1 of the relay 5CR which becomes energized upon energization of the relay 1CR.

Subject to the control of the relays 3CR and 4CR, the low feed motor contactor 2M is adapted to energize the motor 88 from the supply lines L1, L2 and L3 via a set of multiple contacts 2M1. The actuating winding of the contactor 2M derives its power from the control circuit L1-1, L3-1 via interlock switches 4CR1 and 5CR1 of the control relays 4CR and 5CR, and also via manual switch SS2, contacts 1F5, start switch SW and stop switch SP. The contactor 2M is also adapted to energize the winding 101 of the low feed magnetic clutch 85 by connecting the latter across the direct current terminals of the rectifier R via interlock switch 3CR1 of the relay 3CR. The contactor 2M when energized is further adapted to de-energize the relay 1CR by opening the contacts 2M6 which are in series with the latter's actuating winding.

Starting of the low feed reverse drive after cutoff of the rapid traverse forward drive is effected by closure of the positioning switch PS1 in response to rightward movement of the final positioning plunger 144 in the gage head. Stopping of the low feed reverse drive when the table has reached its preselected position is effected by opening of the switch PS1 as the plunger 144 recedes to the left. To enhance the sensitivity and preserve the accuracy of the automatic positioning device, provision is made for minimizing the current across the contacts of the switch PS1. The latter is accordingly arranged to control the low feed motor contactor 2M by means of an electronic relay 4CR. This relay is adapted to be energized through an amplifier tube AT powered by transformer T1 and rectifiers R1, R2. The control grid of the tube is connected so as to have a negative bias which normally prevents the tube from conducting. The switch PS1 is connected between the cathode and the control grid and, when closed, neutralizes the bias on the grid and permits the tube AT to energize the relay 4CR.

The transformer T1 also furnishes power to the relay 5CR which has a time delay opening characteristic for interlocking purposes. The power supply for both the relays 4CR and 5CR is made subject to the control of relays 1CR and 2CR and the contactor 2M by means of the normally open contacts 1CR1, 1CR2, 2CR3 and 2M5.

Upon excessive movement of the table in rapid traverse forward drive, the normally closed emergency limit switch LS2 will be opened due to contact between its operating member 160 and the end face 159 of the plunger 131. This will immediately de-energize the contactor 1F and interrupt the normal supply of power to the main drive motor 39. The latter can then be rapidly decelerated by the well-known expedient of plugging, i.e., reversely connecting the motor across the power supply. This is accomplished by the closure of interlock contacts 1F4 upon de-energizing of the contactor 1F, completing a circuit through the winding of reverse contactor 1R to energize the same and effect closure of its set of main reverse contacts 1R1. The circuit through the winding 1R includes a plugging switch PL which remains closed as long as the motor 39 turns. Once the motor has stopped, however, the switch PL mechanically opens and de-energizes the contactor 1R leaving the motor disconnected from all power.

*Synopsis of operation*

Although the operation of the embodiment of automatic positioning device described above will undoubtedly be apparent to those skilled in the art, a brief synopsis might be considered appropriate at this point. Assume first that the machine is at rest with the table 26 located in a given starting position adjacent the front of the machine bed 21. If the starting button SW should be depressed momentarily, the motor contactor 1F will become energized and start the motor 39 in the manner already described. The manual switch SS2 at the right-hand end of the machine bed should now be closed.

The table 26 can be conditioned for operation in rapid traverse forward drive simply by shifting the direction control lever 56 to the right (as viewed in Fig. 3). This effects a corresponding rightward travel of the shifter rod 55 of the direction control clutch 49 and at the same time serves to close the switch SS1. Closure of the latter thereupon energizes the control relay 1CR, closing normally open contacts 1CR1, 1CR2, 1CR3 and thereby energizing control relays 5CR and 3CR. When the latter becomes energized, it opens interlock contacts 3CR1 and precludes energizing of the winding 101 of the low feed magnetic clutch 85. By the same token, energization of the low feed motor contactor 2M will be precluded by the normally open contacts 4CR1 of the relay 4CR. With the control circuit thus set up, movement of the table in rapid traverse forward can be initiated simply by shifting the lever 61 of the main transmission into its proper position.

The table 26 will travel at the rapid traverse forward rate until the rapid traverse cutoff push rod 131 cams the limit switch LS1 into closed position. This energizes the control relay 2CR, closing normally open contacts 2CR2 and 2CR3. Consequently, the direction control clutch knockout solenoid S becomes energized and shifts the clutch 49 from rapid traverse forward to neutral position, at the same time opening the switch SS1.

Coasting after cutoff of the rapid traverse forward drive will move the table past its preselected position and eventually will cause the final positioning push rod 144 in the gage head to close the final positioning switch PS1. Closure of the latter energizes the relay 4CR through the amplifier tube AT, closing normally open contacts 4CR1 and opening normally closed contacts 4CR2. Opening of the latter results in the de-energizing of the relay 3CR to effect closure of the clutch interlock contacts 3CR1. Closure of the contacts 4CR1 serves to energize the low feed motor contactor 2M, closing the line contacts 2M1 and starting the low feed motor 88. At the same time, the normally open contacts 2M4 close to energize the winding 101 of the low feed magnetic clutch 85, thereby connecting the motor 88 to the table drive mechanism. This causes the table to move in the reverse direction at its low feed rate. Energization of the contactor 2M also serves to open the normally closed contacts 2M6 permitting the control relay 1CR to drop out.

Continued movement of the table 26 in the reverse direction causes the final positioning plunger 144 to recede leftwardly under the force of its compression spring 146. As the table reaches its preselected position, this receding movement of the push rod 144 serves to open the final positioning switch PS1 in the manner already described. Opening of the switch PS1 thereupon de-energizes the relay 4CR, opening contacts 4CR1 to de-energize the low feed motor contactor 2M. This serves to open the contacts 2M1 to stop the low feed motor 88. De-energization of the contactor 2M also opens the contacts 2M4 and 2M5 to de-energize the magnetic clutch winding 101 and the control relay 5CR. At the same time, the contacts 4CR2 become closed so as to energize the relay 3CR and open the normally closed contacts 3CR1 to restore the interlock in the circuit of the magnetic clutch winding 101. After a given time interval, determined by the time delay characteristic of the relay 5CR, the latter opens and de-energizes the relay 3CR permitting the interlock contacts 3CR1 to close once more. The time delay achieved by the relay 5CR should be sufficient to preclude energizing of the magnetic clutch winding 101 until the low feed motor 88 has come to a stop.

*Positioning the headstock*

As indicated earlier herein, the positioning mechanism including a measuring unit 106a for the headstock 30 is substantially identical to that for the table 26. A few minor differences might be noted, however. As indicated in Figs. 2 and 3, the main transmission of the machine is adapted to drive the headstock through a shaft 168 parallel to the table drive shaft 58. The shaft 168 transmits power to headstock driving screw 169 via a direction control clutch 170 (Figs. 2 and 12) similar to the clutch 49 in the table drive. The clutch 170 has a shiftable member which is positionable in a rapid traverse up, a rapid traverse down, or a neutral position as a result of movement of a shifter rod 170A. The latter may, of course, be actuated by means of a direction control lever 171 (Figs. 1 and 2) similar to the lever 56 of the table.

In order to achieve interruption of the rapid traverse feed at the proper point in the headstock positioning cycle, the clutch 170 is equipped with a power-actuated knockout mechanism 172. The latter comprises a solenoid HS (Fig. 12) having a slidable core 174 which is connected to the shifter rod 170 by a pair of pivoting links 175, 176, a slidable rod 178, a rock shaft 179 having depending cranks 180, 181, and an extension 170B of the shifter rod.

Overtravel of the shifter rod 170A from rapid traverse in one direction through neutral is precluded by a mechanism functionally similar to the interlock mechanism utilized in connection with the directional clutch knockout mechanism associated with the table. Thus there is rigidly fixed to the supporting bracket of the unit 172 an abutment member 182 which is adapted to engage the sidewall of a notch 184 in the upper edge of link 176. The latter is provided with an elongated slot 185 which serves to connect it with a pivot pin 186 carried by the link 175 which is pivoted to the unit supporting bracket as at 188. The member 176 is also pivotally secured to the sliding rod 178 as at 189. By reason of the foregoing connections, when the solenoid HS is de-energized the link 176 droops downwardly and permits free sliding of the shifter rod 170A, its extension 170B and the rod 178, without interference between the abutment 182 and the notch 184. Upon energizing of the solenoid HS, however, the link 176 is immediately brought up into a generally horizontal position as indicated in Fig. 13. Thereupon, leftward movement of the sliding rods 170A, 170B and 178 to disengage the clutch shifter from rapid traverse is abruptly halted as the shifter reaches its neutral position due to engagement between the abutment 182 and the notch 184. The interlock mechanism may be protectively encased by means of a cover 190.

Power for low feed operation of the headstock during the positioning cycle is transmitted to the clutch 170 from a low feed drive unit 191 (Figs. 1 and 2) similar to the low feed unit 84 used for the table.

*Modification*

The illustrative automatic positioning mechanism described above involves reversing of the translatable machine member incident to positioning the same at the predetermined ultimate point. The present invention is not, however, limited to reversing the machine member incident to positioning the same but, on the contrary, applies with equal facility to positioning of the machine member entirely with unidirectional motion. The latter is accomplished by utilizing the same general mechanism already described herein, with very minor changes in its control circuit.

Turning to Fig. 14, there is shown a control circuit very similar to the one shown in Fig. 11 but which has been slightly modified to effect unidirectional positioning. Consequently, like reference characters will be applied to like parts and only the changes peculiar to the circuit of Fig. 14 will be described. Comparing Fig. 14 and Fig. 11, it will be noted that contacts 1CR2 and 2CR3 have been eliminated and a jumper J has been connected between the secondary winding of transformer T1 and rectifier R1. Contacts 4CR1 and 4CR2 of Fig. 11 have been eliminated in Fig. 14 and replaced by contacts 2CR4 and 2CR5, respectively, both operated by relay 2CR. In addition, in the circuit of Fig. 14 a normally closed set of contacts 4CR3 operated by the relay 4CR is connected between the contacts 5CR1 and the switches SS1 and SS2. Also, two of the sets of contacts 2M1 which control the low feed motor 88 are reversed with respect to line conductors L1, L2 so that the motor 88 as shown in Fig. 14 will drive in the opposite direction from the motor 88 as shown in Fig. 11.

To condition automatic positioning device for operation with the circuit of Fig. 14, the automatic positioning switch SS2 at the right-hand end of the machine bed should be manually closed. The starting button SW should then be depressed momentarily to energize the motor contactor 1F and start the motor 39 as already described in connection with the circuit of Fig. 11. The system may, of course, be utilized for positioning of either the table or the headstock.

For example, to position the table 26 unidirectionally and in a forward direction (toward the right as viewed in Fig. 3), the control lever 56 is shifted to the right, engaging the direction control clutch 49 and closing the switch SS1. Closure of SS1 energizes control relay 1CR, closing normally open contacts 1CR1 and 1CR3 and thus energizing control relays 5CR and 3CR. The latter when energized opens interlock contacts 3CR1 and precludes energizing of the winding 101 of the low feed magnetic clutch 85. Energizing of the low feed motor contactor 2M is precluded by the normally open contacts 2CR1 of the relay 2CR. Under these conditions, movement of main transmission lever 61 to its proper position will initiate rapid traverse forward movement of the table 26.

The table 26 will travel forward (toward the right as viewed in Fig. 3) until the rapid traverse cutoff push rod 131 in the gage head cams the limit switch LS1 into closed position. Closing of switch LS1 energizes control relay CRZ, closing contacts 2CRZ and energizing direction control clutch knockout solenoid S, disengaging the directional control clutch 49, and shortly thereafter opening the switch SS1. Energizing of control relay 2CR also closes contacts 2CR4 and opens contacts 2CR5, resulting in energizing of low feed motor contactor 2M and low feed motor 88, and de-energizing of interlock relay 3CR. The latter action results in closure of interlock contacts 3CR1 and closes the circuit of winding 101 of low feed magnetic clutch 85.

Since the low feed drive of motor 88 and clutch 85 is non-reversible, and the clutch 85 is engaged substantially simultaneously with disengagement of the clutch 49, free coasting of the table 26 is eliminated. The clutch 85 simply slips until the speed of the table 26 has decreased to the speed of the low feed drive. The table 26 continues to move forward (to the right as viewed in Fig. 3) powered by the low feed motor 88 until it reaches the ultimate position, whereupon the positioning switch PS1 in the gage head closes. Closure of the switch PS1 energizes the control relay 4CR, opening contacts 4CR3 and de-energizing the low feed motor contactor 2M. De-energizing of the contactor 2M in turn de-energizes both the low feed motor 88 and the low feed clutch winding 101, leaving the table 26 precisely situated in its predetermined ultimate position.

I claim as my invention:

1. In a machine tool having a main drive for translating a machine member relative to a support, a device for automatically positioning such member in a preselected final position relative to said support and comprising the combination of power means for effecting disengagement of the main drive from said translatable member as the same approaches said preselected final position during movement in a given direction and at a given rate, said machine member being allowed to coast past said position, an independent drive means for translating said member in a reverse direction and at a substantially lower feed rate, a double-acting measuring unit interconnected between said member and said support for actuation in response to movement of the machine member relative to said support, and electrical control means interconnected between said unit and said disengaging means and said independent drive means for controlling both means from said unit, said measuring unit being adapted to define a preselected control position of said member and a preselected final position of said member precisely located relative to said support, said unit acting through said control means to actuate said power disengaging means when said member has reached said first position and to subsequently energize said independent drive means to move said member slowly and positively in a reverse direction to said final position, and means in said unit acting through said control means for de-energizing said independent drive when said member has reached said final position.

2. In a machine tool, the combination of a support, a translatable member on said support and having a rapid drive therefor, a first clutch interconnecting said drive with said member, a slow speed drive, a second clutch interconnecting said slow speed drive with said member, a measuring unit including a first part mounted on said member and a second part mounted on said support, first switching means in said unit, electrically controlled means interconnecting said switching means with said first clutch and responsive to said switching means for disengaging the clutch, said unit and said first switching means cooperating to disengage said first clutch when said member approaches a predetermined position, said slow speed drive serving to move said member into a final position after disengagement of said first clutch, second and sensitive switching means operatively connected to said measuring unit, electrical means including an amplifying tube for selectively producing a substantial output current, electrical means connecting said second switch means to said amplifying tube, said amplifying tube being operative in response to the operation of said second switching means, and electrical means connected to said second clutch and the output of said tube, said second switching means being operated by said unit to act through said tube to disconnect said second clutch when said member moves into said final position.

3. In a machine tool having a main drive for translating a machine member relative to a support, an automatic positioning device for moving said machine member into a preselected position relative to said support and comprising the combination of power means for declutching the main drive from the machine member during translational movement of the latter as the same approaches said preselected position at a rapid traverse rate in a given direction relative to the support, means including an independent drive motor and clutch for translating the machine member at a relatively lower feed rate, a measuring unit having a portion susceptible of mounting on the machine member and a portion susceptible of mounting on the support, and electrical control means interconnected between said measuring unit and said declutching power means, independent drive motor, and clutch, said unit being adapted upon relative movement between said portions to act through said control means to effect sequential actuation of the power declutching means together with said independent drive motor and clutch to bring said member into said preselected position, the latter being defined by said measuring unit.

4. In a machine tool having a main drive for translating a machine member relative to a support, an automatic positioning device for moving said machine member into a preselected position relative to said support and comprising the combination of power means for declutching the main drive from the machine member during translational movement of the latter as the same approaches said preselected position at a rapid traverse rate in a given direction relative to the support, means including an independent drive motor and clutch for translating the machine member in the same direction at a relatively lower feed rate, said translating means serving to decelerate said machine member from the rapid traverse rate to the lower feed rate, a measuring unit having a portion susceptible of mounting on the machine member and a portion susceptible of mounting on the support, and electrical control means interconnected between said measuring unit and said declutching power means, independent drive motor, and clutch, said unit being adapted upon relative movement between said portions to act through said control means to effect sequential actuation of the power declutching means together with said independent drive motor and clutch to bring said member into said preselected position, the latter being defined by said measuring unit.

5. In a machine tool having a main drive for translating a machine member relative to a support, an automatic positioning device for moving said machine member into a preselected position relative to said support and comprising the combination of power means for declutching the main drive from the machine member during translational movement of the latter as the same approaches said preselected position at a rapid traverse rate in a given direction relative to the support, said machine member being allowed to coast past said preselected position and then stop, means including an independent drive motor and clutch for starting the machine member in a reverse direction and translating the same at a relatively lower feed rate, a measuring unit having a portion susceptible of mounting on the machine member and a portion susceptible of mounting on the support, and electrical control means interconnected between said measuring unit and said declutching power means, independent drive motor, and clutch, said unit being adapted upon relative movement between said portions to act through said control means to effect sequential actuation of the power declutching means together with said independent drive motor and clutch to bring said member into said preselected position, the latter being defined by said measuring unit.

6. In a machine tool having a member translatable relative to a support and having a main driving means for such member, an automatic positioning device for shifting said member into a preselected position and comprising the combination of double-acting measuring means responsive to relative movement in one direction between the machine member and its support, electrical control means for effecting disengagement of the main drive means as the member approaches its preselected position, said control means being governed by said measuring means, an independent drive for moving the machine member toward said preselected position at a relatively low feed rate upon disengagement of the main drive, and additional electrical control means interconnected between said measuring means and said independent drive and responsive to said measuring means to energize said independent drive for positively translating said machine member to said preselected position, said measuring means further acting through said control means for de-energizing said independent drive when said machine member has reached said preselected position.

7. In a machine tool having a member translatable relative to a support and having a main driving means for such member, an automatic positioning device for shifting said member into a preselected position and comprising the combination of double-acting measuring means responsive to relative movement in one direction between the machine member and its support, electrical control means for effecting disengagement of the main drive means as the member approaches its preselected position, said control means being governed by said measuring means, an independent drive for moving the machine member in the same direction toward said preselected position at a relatively low feed rate upon disengagement of the main drive, said independent drive serving to decelerate said machine member to said low feed rate, and additional electrical control means interconnected between said measuring means and said independent drive and responsive to said measuring means to energize said independent drive for positively translating said machine member to said preselected position, said measuring means further acting through said control means for de-energizing said independent drive when said machine member has reached said preselected position.

8. In a machine tool having a member translatable relative to a support and having a main driving means for such member, an automatic positioning device for shifting said member into a preselected position and comprising the combination of double-acting measuring means responsive to relative movement in one direction between the machine member and its support, electrical control means for effecting disengagement of the main drive means as the member approaches its preselected position, said control means being governed by said measuring means, an independent drive for moving the machine member toward said preselected position at a relatively low feed rate upon disengagement of the main drive and after the member has coasted past its preselected position, and additional electrical control means interconnected between said measuring means and said independent drive and responsive to said measuring means to energize said independent drive for positively returning said machine member to said preselected position, said measuring means further acting through said control means for de-energizing said independent drive when said machine member has reached said preselected position.

9. In a device for automatically arresting the movement of a translatable machine tool member relative to a support with such member in a preselected position relative to the support, the combination of a main drive for translating the member, a clutch connecting said main drive with said translatable member, electromagnetic means for actuating said clutch and thereby disengaging the translatable member from the main drive therefor, an independent drive means adapted to move said member at a substantially lower rate, a power source for energizing said electromagnets means and said independent drive means, a first limit switch adapted to effect energization of said electromagnetic means by power from said source and thereby actuate said clutch to interrupt said main drive, and a final positioning switch adapted sequentially to effect the energization of said independent drive means and to deenergize the same with the translatable member at rest in the preselected position.

10. In a device for automatically arresting the movement by a main drive of a translatable machine tool member relative to a support with such member in a preselected position relative to the support, the combination of a clutch connecting said main drive with said translatable member, electromagnetic means for actuating said clutch and thereby disengaging the translatable member from the main drive therefor, an independent drive means serving to arrest the movement imparted to said machine member by said main drive and adapted to move said member in the same direction at a substantially lower rate, a first limit switch adapted to effect actuation of said electromagnetic means and said clutch to interrupt said main drive and a final positioning switch adapted sequentially to start said independent drive means and stop the same with the translatable member at rest in the preselected position.

11. In a device for automatically arresting the movement by a main drive of a translatable machine tool member relative to a support with such member in a preselected position relative to the support, the combination of a clutch connecting said main drive with said translatable member, electromagnetic means for actuating said clutch and thereby disengaging the translatable member from the main drive therefor, an independent drive means adapted to move said member in a reverse direction at a substantially lower rate, a first limit switch adapted to effect actuation of said electromagnetic means and said clutch to interrupt said main drive and allow the translatable member to coast past the preselected position, and a final positioning switch adapted sequentially to start said independent drive means and stop the same with the translatable member at rest in the preselected position.

12. In a machine tool having a main drive for translating a machine member relative to a support in a first direction and at a rapid traverse rate, an automatic positioning device for moving said machine member into a preselected position relative to said support and comprising the combination of power means for declutching the main drive from the machine member as the same approaches said preselected position during said rapid traverse forward movement, means including an independent drive motor and clutch for translating the machine member at a relatively low feed rate, a gage head element and a gage trough capable of supporting a gage member, one of said elements being susceptible of mounting on the machine member and the other susceptible of mounting on the support, said gage head being adapted to cooperate with a gage member carried by said trough to define the location of said preselected position, control means interconnected between said gage head element and said power declutching means and between said gage head element and said independent drive motor and said clutch for controlling said declutching means, motor and clutch from said gage head element, said gage head element being adapted to be operated through a gage member carried by said trough upon relative movement between said head and said trough to effect sequential actuation of the power declutching means and said independent drive motor and clutch to bring said member to rest in said preselected position.

13. In a machine tool having a member translatable relative to a support and having a main driving means including a clutch engageable with such member, an automatic positioning device for shifting said member into a preselected position and comprising, in combination, measuring means, including gage head means and gage head actuating means, said two means being adapted to be respectively interconnected with the machine member and its support to have movement relative to each other proportional to relative movement between the machine member and its support, a control linkage including an actuator electrically interconnected with said gage head means and controlled thereby for declutching the main drive means as the member approaches its preselected position, an independent drive motor, electromagnetic clutch means for connecting said independent drive motor to said machine member to move the same toward said preselected position at a relatively low feed rate upon declutching of the main drive, and an electrical control means interconnected between said gage head means and said independent drive motor and said electromagnetic clutch and responsive to actuation of said gage head means by said head actuating means to sequentially energize said independent drive motor and said electromagnetic clutch and immediately disengage the same when the translatable machine member reaches its preselected position.

14. In a machine tool, the combination of a support member, a translatable member mounted on said support member, rapid drive means, transmission means including a first clutch disengageably connecting said drive means with said translatable member for movement in a given direction, a slow speed drive including an independent motor therefor, transmission means including a second clutch interconnecting said slow speed drive with said translatable member, gage measuring means interconnected between said translatable member and said support member for accurately determining a preselected position of said translatable member relative to said support member, electrical control means including switching means interconnected between said measuring means and said two clutch means, said electrical control means cooperating with said measuring means to disengage said first clutch through action of said switching means when said translatable member has reached the vicinity of said preselected position, said slow speed drive positively moving said translatable member toward said position after disengagement of said first clutch, said measuring means being responsive to movement of said translatable member into said preselected position to actuate said control means and disengage said second clutch through action of said switching means and thereby accurately locate said translatable member in said position.

15. In a machine tool, the combination of a support member, a translatable member mounted on said support member, rapid drive means, transmission means including a first clutch disengageably connecting said drive means with said translatable member for movement of the latter in a given direction, a slow speed drive, transmission means including a second clutch interconnecting said slow speed drive with said translatable member, gage measuring means interconnected between said translatable member and said support member for accurately determining a preselected position of said translatable member relative to said support member, control means interconnected between said measuring means and said first clutch to disengage said first clutch when said translatable member has reached the vicinity of said preselected position, said slow speed drive positively moving said translatable member toward said position after disengagement of said first clutch, electrical control means interconnected between said measuring means and said two clutch means, sensitive switching means operatively connected to said measuring means and to said control means, said measuring means actuating said sensitive switching means in response to movement of said translatable member into said position to disengage said second clutch through coaction with said electrical control means and thereby accurately locate said translatable member in said position.

16. In a machine tool, the combination of a support member, a translatable member mounted on said support member, rapid drive means, transmission means including a first clutch disengageably connecting said drive means with said translatable member for movement of the latter in a given direction, first operating means connected to said clutch for causing engagement thereof, second operating means including a solenoid having a lost motion interconnection with said clutch for causing disengagement thereof, a mechanical interlock connected with said second operating means for limiting movement thereof by said solenoid, a slow speed drive including an independent motor therefor, transmission means including a second clutch interconnecting said slow speed drive with said translatable member for movement thereof in a direction opposite to said given direction, double-acting gage means interconnected between said translatable member and said support member for accurately determining a preselected position of said translatable member relative to said support member, electrical control means including switching means interconnected between said gage means and said two clutch means, said control means and switching means cooperating with said gage means to disengage said first clutch through action of said solenoid when said translatable member has reached the vicinity of said preselected position, said translatable member being permitted to coast to a halt beyond said preselected position, said slow speed drive positively moving said translatable member toward said position after disengagement of said first clutch, said gage means being responsive to movement of said translatable member into said position to actuate said control means to disengage said second clutch through action of said switching means to accurately locate said translatable member in said position.

References Cited in the file of this patent

UNITED STATES PATENTS

| Re. 15,125 | Lindquist et al. | June 14, 1921 |
| 2,311,142 | Turrettini | Feb. 16, 1943 |
| 2,561,346 | De Vlieg et al. | July 24, 1951 |